(12) United States Patent
Oren

(10) Patent No.: US 11,414,190 B2
(45) Date of Patent: Aug. 16, 2022

(54) GASEOUS MATTER CAPTURE SYSTEM AND METHOD

(71) Applicant: HIGH HOPES LABS LTD., Jerusalem (IL)

(72) Inventor: Eran Oren, Tel Aviv (IL)

(73) Assignee: HIGH HOPES LABS LTD., Jerusalem (IL)

( * ) Notice: Subject to any disclaimer, the term of this patent is extended or adjusted under 35 U.S.C. 154(b) by 0 days.

(21) Appl. No.: 17/425,504

(22) PCT Filed: Dec. 17, 2020

(86) PCT No.: PCT/IL2020/051301
§ 371 (c)(1),
(2) Date: Jul. 23, 2021

(87) PCT Pub. No.: WO2021/124332
PCT Pub. Date: Jun. 24, 2021

(65) Prior Publication Data
US 2022/0041282 A1 Feb. 10, 2022

Related U.S. Application Data

(60) Provisional application No. 62/952,248, filed on Dec. 21, 2019.

(51) Int. Cl.
*B64C 39/02* (2006.01)
*B01D 53/04* (2006.01)
(Continued)

(52) U.S. Cl.
CPC ............ *B64C 39/024* (2013.01); *B01D 53/04* (2013.01); *B01D 53/22* (2013.01); *B01D 53/62* (2013.01);
(Continued)

(58) Field of Classification Search
CPC ..... B64C 39/024; B64C 39/022; B01D 53/04; B01D 53/22; B01D 53/62; B01D 53/84;
(Continued)

(56) References Cited

U.S. PATENT DOCUMENTS 3,897,032 A 7/1975 Hermann
4,963,165 A 10/1990 Blume et al.
(Continued)

FOREIGN PATENT DOCUMENTS

AU 2008239727 A1 10/2008
WO 2016185387 A1 11/2016

OTHER PUBLICATIONS

Hunt, Julian David, et al. "Using the jet stream for sustainable airship and balloon transportation of cargo and hydrogen", Energy Conversion and Management: X, 2019, 3: 100016., <https://doi.org/10.1016/j.ecmx.2019.100016> (Jul. 27, 2019) Section 5.9. Hydrogen liquefaction.
(Continued)

*Primary Examiner* — Anita Nassiri-Motlagh
(74) *Attorney, Agent, or Firm* — Browdy and Neimark, P.L.L.C.

(57) ABSTRACT

A gaseous matter capture system and method comprising an aerial unit configured to capture gaseous matter directly from the atmosphere and further comprising storage means configured to transfer said gaseous matter for further processing in a non-aerial unit for the purposes of climate change mitigation and further use of captured gases.

18 Claims, 5 Drawing Sheets

(51) Int. Cl.
  *B01D 53/22* (2006.01)
  *B01D 53/62* (2006.01)
  *B64B 1/50* (2006.01)
  *B64F 3/00* (2006.01)
  *G01W 1/08* (2006.01)
  *B01D 53/84* (2006.01)
  *B01D 53/86* (2006.01)

(52) U.S. Cl.
  CPC ............ *B01D 53/84* (2013.01); *B01D 53/86* (2013.01); *B64B 1/50* (2013.01); *B64C 39/022* (2013.01); *B64F 3/00* (2013.01); *G01W 1/08* (2013.01); *B01D 2253/108* (2013.01); *B01D 2253/204* (2013.01); *B01D 2257/504* (2013.01); *B01D 2258/06* (2013.01); *B64C 2201/022* (2013.01); *B64C 2201/12* (2013.01)

(58) Field of Classification Search
  CPC . B01D 53/86; B64B 1/50; B64F 3/00; G01W 1/08
  USPC ............................................................ 701/3
  See application file for complete search history.

(56) References Cited

U.S. PATENT DOCUMENTS

| 8,702,847 | B2 | 4/2014 | Lackner et al. |
|---|---|---|---|
| 2008/0272233 | A1 | 11/2008 | Marlin |
| 2011/0146488 | A1 | 6/2011 | Jeffrey |
| 2012/0073682 | A1 | 3/2012 | Geneste |
| 2013/0115153 | A1 | 5/2013 | Lackner et al. |
| 2014/0061540 | A1 | 3/2014 | Long et al. |
| 2017/0028347 | A1 | 2/2017 | Wright et al. |
| 2017/0106330 | A1 | 4/2017 | Gebald |

OTHER PUBLICATIONS

Amrit Kumar et al: "Direct Air Capture CO 2 by Physisorbent Materials", Angewandte Chemie International Edition, 54,(48):14372-14377 (2015).

Eloy S. Sanz-Perez et al: "Direct Capture f CO 2 from Ambient Air", Chemical Reviews, 116 (19):11840-11876 (2016).

Merkel Tim et al: "Membrane Process to Seques TER CO2 From Power Plant Flue Gas", pp. 1-35, (2009).

Jackson Steven et al: "Optimization of the CO2 Liquefaction Process-Performance Study with Varying Ambient Temperature", Applied Sciences, 9(20):4467 (2019).

Jackson S et al: "A comparison of the energy consumption for CO2 compression process alternatives", IOP Conference Series: Earth and Environmental Science, 167:012031, (2018).

Power B.: "Capturing CO2: Gas Compression 1-15 Vs. Liquefaction", News and Technology for the Global Energy Industry, pp. 1-4, (2009).

Foucher P. Y. et al: "Carbon dioxide atmospheric vertical profiles retrieved from space observation using ACE-FTS solar occultation instrument", Atmospheric Chemistry and Physics, 11(6):2455-2470 (2011).

GASEOUS MATTER CAPTURE SYSTEM AND METHOD

FIELD OF THE INVENTION

The present invention relates to the field of gaseous matter capture, and, more particularly, but not exclusively, to capturing carbon dioxide directly from the atmosphere for the purposes of climate change mitigation and further use of captured gases.

BACKGROUND OF THE INVENTION

Climate change has long been a global concern having a potential enormous impact on the global environment and human wellbeing. Human activities such as the combustion of fossilized fuels and deforestation, along with derivative phenomena such as accelerated permafrost thawing, increase the amount of greenhouse gases in the earth's atmosphere and cause the global climate to change. As a result, many concepts were tested and implemented in order to mitigate the effects of climate change.

Nowadays, the Carbon Dioxide concentration in the earth's atmosphere is 411 parts per million (ppm). This amount increases by over 2 ppm per year, due to the continued emissions in the multiple and distributed sectors of the world's economy. According to the Paris Agreement led by the UNFCCC and signed by most countries in 2015, mankind has to limit the average temperature increase to 'well below' 2° C. compared to pre-industrial levels, in order to avoid catastrophic consequences. In order to try and predict how to avoid said potentially catastrophic 2° C. increase limit, models vary between allowing for a remaining carbon quota, but generally aim at remaining below 430 ppm, whereas 450 ppm indicates an approximate transition to a high probability of irreversible effects as one ppm roughly translates to several Billions of metric tons of CO2, this implies the need to remove green-house gases from the atmosphere in the order of tens of Billions tons per year.

A variety of carbon dioxide capture methods have been described in the art. Among them are scrubbers configured to be implemented in streams of high carbon dioxide concentrations like those found in exhausts of power plants, industrial facilities or vehicles. Although such methods of capturing carbon from flue gas may provide some mitigation to the continuous increase in carbon emissions, they are limited in their applicability, cannot address carbon emissions from distributed sources and also cannot address the high carbon dioxide concentration already circulating as part of the earth's atmosphere.

The capturing of carbon dioxide directly from the earth's atmosphere using chemical processes of different types has been disclosed by several publications, for example, patent applications publications US20170106330A1 and US20170028347A1 disclose the capturing of carbon dioxide conducted by stationary, terrestrial systems using sodium hydroxides that later allows compression of a high purity carbon dioxide stream into liquids or supercritical liquids. Other means of chemical and physical capturing and processing of carbon dioxide have been disclosed, for example, in patent applications publications WO2016185387A1, AU2008239727B2 and US20140061540A1. Patent publications U.S. Pat. Nos. 4,963,165A and 8,702,847B2 also disclose the capturing, separating, condensing and recycling of carbon dioxide.

Patent applications publication US20170106330A1 discloses a system for separating and storing molecules, atoms and/or ions from air, comprising at least one collecting tank configured to receive molecules, atoms and/or ions that are separated from ambient air. The system further comprising at least one storing tank for storing the separated molecules, atoms and/or ions, and at least one outlet, wherein the air collecting means can be a gas tower or a gas balloon.

Patent applications publications US20110146488A discloses capturing and sequestering significant amounts of carbon dioxide molecules from an incoming air stream by directing flow into an airborne cylindrical carbon composite canister, or "Atmospheric Carbon Dioxide Mitigation" (ATCOM) canister which has the capacity to capture, sequester, and then release the species with negative ionization within a desired high frequency electromagnetic wave field. The initial airflow into the ATCOM canister is slowed to a specific flow velocity as the air stream travels through a volute chamber with resistance added impellers, and then into a free flow chamber where the incoming flow velocity compresses the air volume, allowing for an osmotic equality distribution of the concentration of CO2 molecules.

From the state of the art indicated above, one can notice that different trials and development are being conducted, although generally these efforts do not manage to meet the market requirements in terms of price, mitigation (with regard to carbon emissions per ton of carbon dioxide captured) and applicability.

Neither of the publications indicated above do not teach, alone or in combination, a gaseous matter capture system, comprising an aerial unit and a non-aerial unit and configured to transfer the stored separated gaseous matter from the aerial unit to the non-aerial unit for further processing or storage.

There is a need to provide a system and method for capturing gaseous matter directly from the atmosphere in an economical, scalable and applicable manner.

There is a further need to provide a system and method configured to release storage means full of compressed gaseous matter for further processing by a non-aerial unit, thus increasing the gaseous matter collecting efficiency by allowing to capture more gaseous matter such as carbon dioxide mass in a single airborne mission hence reducing regular maintenance and ground time intervals.

SUMMARY OF THE INVENTION

The present invention provides a system and method for capturing gaseous matter directly from the atmosphere which is economical and highly scalable with regard to any other available system and method.

Said system and method may further include using the climatic conditions found at high altitude that enable gases' phase transitions at low temperatures and relatively low pressures in order to liquefy or solidify gaseous matter such as carbon dioxide, and thus separate it from the other gases forming the atmospheric mixture.

Said system and method may further include utilizing high altitude platform/vehicle such as a high-altitude balloon configured to capture large amounts of high altitude gaseous matter such as CO2, wherein said high altitude CO2 concentration tends not to be diluted due to the typical strong winds and resulting advection.

Said system and method may further include transferring the stored separated gaseous matter from the aerial unit to the non-aerial unit for further processing or storage.

Said system and method may further include increasing the gaseous matter collecting efficiency by allowing to capture more gaseous matter such as carbon dioxide mass in a single airborne mission hence reducing regular maintenance and ground time intervals.

The following embodiments and aspects thereof are described and illustrated in conjunction with systems, devices and methods which are meant to be exemplary and illustrative and not limiting in scope. In various embodiments, one or more of the above-described problems have been reduced or eliminated, while other embodiments are directed to other advantages or improvements.

According to one aspect, there is provided a gaseous matter capture system, comprising at least one aerial unit configured to be airborne, at least one non-aerial unit, at least one gas separation means configured to be carried by the aerial unit, storage means configured to be carried by the aerial unit, a controller configured to control the system's operation and an energy source configured to enable the system's operation, wherein the at least one gas separation means is configured to separate at least one designated gaseous matter from the air, wherein the at least one separated gaseous matter is configured to be stored within the storage means and wherein the aerial unit is configured to transfer the stored separated gaseous matter to the non-aerial unit.

According to some embodiments, the at least one gas separation means is operable while the aerial unit is airborne at an altitude range of 5-15 km.

According to some embodiments, the gas separation means comprises at least one pressure increasing apparatus.

According to some embodiments, the gas separation means comprises chemical catalysts that may be based on sorbents for carbon dioxide and configured to utilize gas separation procedure.

According to some embodiments, the gas separation means comprises biological enzymes configured to utilize gas separation procedure.

According to some embodiments, the aerial unit is a high-altitude balloon.

According to some embodiments, the aerial unit is configured to be tethered to the non-aerial unit.

According to some embodiments, the aerial unit further comprises self-steering means.

According to some embodiments, the aerial unit is configured to be retrofitted/integrated into the propulsion means to an aerial vehicle.

According to some embodiments, the storage means is at least one compressed gas container that may be configured to be released from the aerial unit and reach the non-aerial unit.

According to some embodiments, the non-aerial unit comprises a designated landing area configured to capture the at least one compressed gas container.

According to some embodiments, the at least one compressed gas container comprises guidance means configured to guide the at least one compressed gas container from the aerial unit to the non-aerial unit.

According to some embodiments, the non-aerial unit is configured to utilize the stored designated gaseous matter captured by the aerial unit.

According to some embodiments, the non-aerial unit is configured to be located on the ground, on a body of water or on a vessel, wherein a non-aerial unit configured to be located on a body of water may further comprise a docking area.

According to some embodiments, the controller is further configured to generate navigation commands in order to control the aerial unit.

According to some embodiments, the gas separation means further comprise an air compressor configured to increase air pressure flowing within to 6-10 Bar above the ambient air pressure.

According to some embodiments, the designated gaseous matter is carbon dioxide.

According to some embodiments, the airborne aerial unit is configured to exploit the low temperatures at high altitudes in order to liquefy or solidify the designated gaseous matter.

According to some embodiments, the at least one gas separation means carried by the airborne aerial unit is configured to exploit high altitude wind in order to harness an incoming airflow pressure for the purpose of gas separation.

According to some embodiments, the potential energy stored within the compressed air may be further utilized by the gaseous matter capture system.

According to some embodiments, the aerial unit is configured to capture carbon dioxide by using a phase transition process at a temperatures range of $-100°$ to $-10°$ and pressures range of 0.2-10 Bar.

According to some embodiments, the energy source is based on solar energy/wind energy/prestored power reservoir or configured to power the aerial unit by using a wired connection.

According to a second aspect, there is provided a method for gaseous matter capture using a gaseous matter capture system, comprising the steps of separating at least one designated gaseous matter from the air using at least one gas separation means carried by an airborne aerial unit, storing the at least one separated gaseous matter within storage means carried by the airborne aerial unit and transferring the stored separated gaseous matter to a non-aerial unit.

BRIEF DESCRIPTION OF THE FIGURES

Some embodiments of the invention are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the invention.

In the Figures.

DETAILED DESCRIPTION OF SOME EMBODIMENTS

Figure 1:
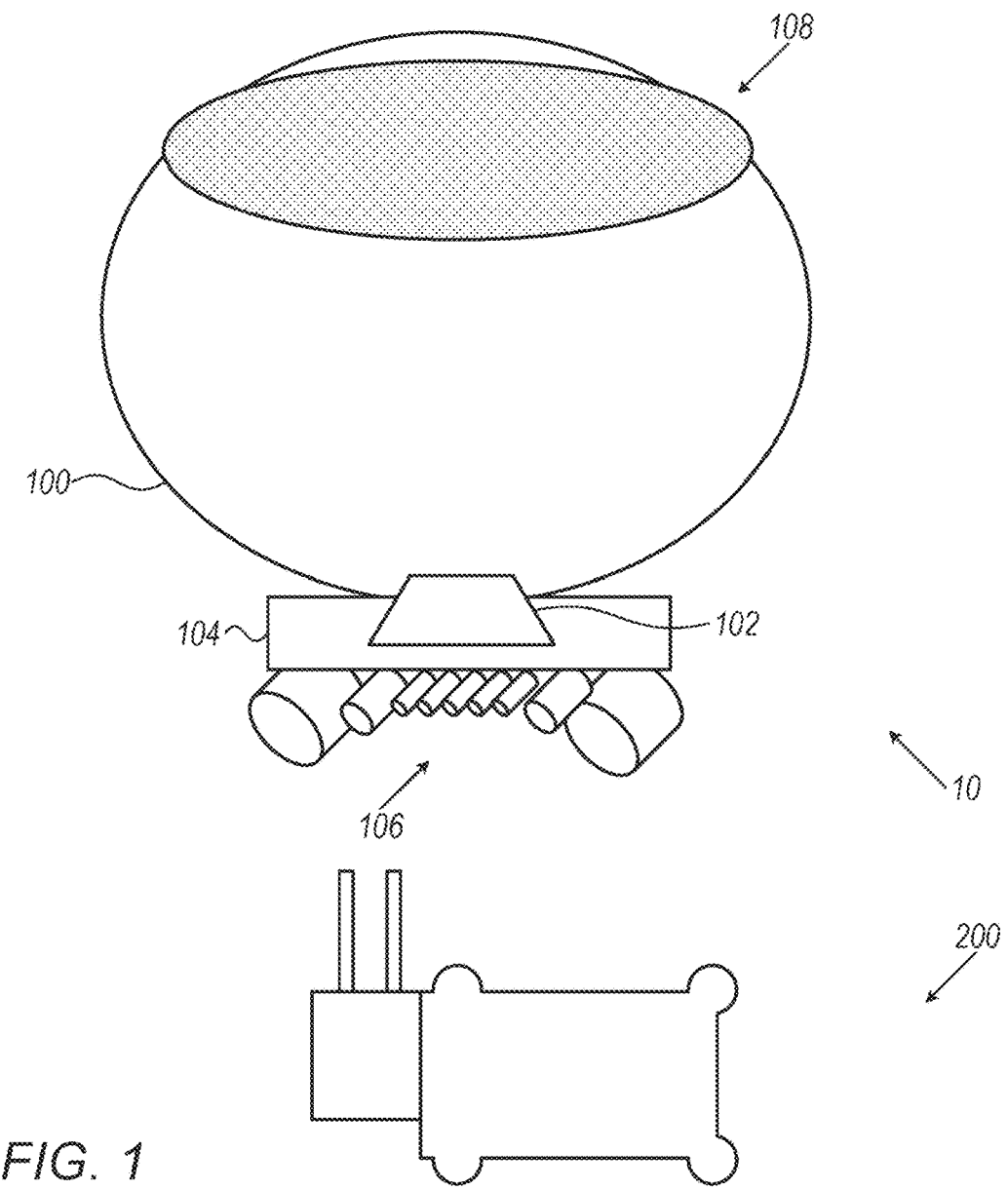
FIG. 1 constitutes a schematic perspective view an aerial unit and non anal unit of a gaseous matter capture system, according to some embodiments of the invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "controlling" "processing," "computing," "calculating," "determining," "establishing", "analyzing", "checking", "setting", "receiving", or the like, may refer to operation(s) and/or process(es) of a controller, a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes.

Unless explicitly stated, the method embodiments described herein are not constrained to a particular order or sequence. Additionally, some of the described method embodiments or elements thereof can occur or be performed simultaneously, at the same point in time, or concurrently.

The term "Controller", as used herein, refers to any type of computing platform or component that may be provisioned with a Central Processing Unit (CPU) or microprocessors, and may be provisioned with several input/output (I/O) ports, for example, a general-purpose computer such as a personal computer, laptop, tablet, mobile cellular phone, controller chip, SoC or a cloud computing system.

The term "Sorbents for carbon capture", as used herein, refers to any material with higher affinity to $CO_2$ when compared to other atmospheric gases such as nitrogen and oxygen and, more specifically, to diverse range of typically porous, solid-phase materials, that can accommodate a wide variety of cations and may include mesoporous silicas, zeolites, metal-organic frameworks, etc., wherein these materials have the potential to selectively remove $CO_2$ from large volumes of air.

The term "Metal-organic framework (MOFs)" as used herein, refers to a class of porous compounds having low heat capacities and consisting of metal ions or clusters coordinated to organic ligands forming 1D, 2D, or 3D structures. Because of their small pore sizes and high void fractions, MOFs are considered a promising potential material for use as an adsorbent to capture $CO_2$ and may provide an efficient alternative comparing to traditional amine solvent-based methods widely used today. $CO_2$ can bind to a MOF surface through either physisorption, which is caused by Van der Waals interactions, or chemisorption, which is caused by covalent bond formation. Once the MOF is saturated with $CO_2$, the $CO_2$ would be removed from the MOF through either a temperature swing or a pressure swing (a process known as regeneration). In a temperature swing regeneration, the MOF would be heated until $CO_2$ desorbs. In a pressure swing, the pressure would be decreased until $CO_2$ desorbs.

The term "ZIFs", as used herein, refers to a class of metal-organic frameworks (MOFs) that are topologically isomorphic with zeolites, wherein a particular MOF named ZIF-8, has a very high separation factor for hydrogen and carbon dioxide mixtures and a relatively high specificity of carbon dioxide over nitrogen. ZIF-8 is also known to be a relatively stable MOF, thus applicable over a wide range of temperatures and pressures. ZIFs are composed of tetrahedrally-coordinated transition metal ions (e.g. Fe, Co, Cu, Zn) connected by imidazolate linkers and having zeolite-like topologies.

The term "inversion layer" as used herein, refers to a layer in the atmosphere, or as a region in terms of altitude, in which temperatures tend to stop decreasing with any further increase in altitude. While thermal inversion can occur in multiple conditions, it is common to refer to the inversion layer as the altitude at which the vertical temperature gradient reverses, at the top of the troposphere, sometimes referred to as the tropopause.

According to some embodiments, the present invention discloses a gaseous matter capture system comprising a light weight aerial unit configured to be released to the atmosphere and comprising at least one gas separation means such as a compressor. According to some embodiments, said aerial unit may be a high-altitude balloon and may further comprise controlling, navigation and steering components. According to some embodiments, said aerial unit is configured to capture large amounts of gaseous matter such as carbon dioxide and to throw it downwards to a designated non-aerial unit where it may be safely caught. According to some embodiments, the aerial unit may be a high-altitude balloon configured for throwing large quantities of captured carbon dioxide in order to allow capturing more carbon dioxide mass in a single airborne mission hence reducing regular maintenance and ground time intervals.

According to some embodiments, the separation of the gaseous matter such as carbon dioxide from the ambient air can be done using multiple techniques and methods such as: coolers, refrigerators, freezers, heat pumps, pressure pumps, compressors, membranes, separation using chemical means or catalysts, separation by biological enzymes, etc. Such techniques and methods are used to increase the rate at which $CO_2$ is captured from the atmospheric ambient air.

According to some embodiments, the gaseous matter capture system is configured to use the low ambient temperatures and high winds that circulate the surrounding atmosphere. The gaseous matter capture system is further configured to prevent dilution of the carbon dioxide in the incoming air stream since that, although the air density is lower in the high troposphere and the lower stratosphere, the volumetric concentration of carbon dioxide is not significantly lower and is almost similar to the levels found at sea level. It is thus applicable to utilize the above described carbon capture method at high altitudes above sea level.

According to some embodiments, the gaseous matter capture system is configured to collect a gaseous matter directly from the atmosphere (wherein a preferable gas to be collected may be carbon dioxide), for purposes of climate change mitigation and gaseous matter reuse. According to some embodiments, the system may be based on carbon dioxide's phase transition at low temperatures, such as in ranges of $-100°$ C. to $-10°$ C. and increased pressure ranges, such as between 0.2 Bar to 10 Bar.

According to some embodiments, in order to remove massive amounts of CO2 directly from the ambient air, without the need for excessive energy input, without the use of dangerous or scarce resources, and in a fully scalable manner, the use of high altitude vehicles equipped with compressors is suggested.

According to some embodiments, once carbon dioxide has been separated from the air flow, it can be stored or utilized further in accordance to various needs or constrains. For example, a separated carbon dioxide may be liquefied/solidified and kept in storage means such as high-pressure containers, wherein said containers can be made of any known material, such as composite carbon fibers, aluminum, polymers etc.

Reference is now made to FIG. 1 which schematically illustrates an aerial unit 100 and non anal unit 200 of gaseous matter capture system 10. As shown, gaseous matter capture system 10 may comprise two main units, aerial unit 100 and non-aerial unit 200. Aerial unit 100 can be, for example, a high-altitude balloon or any other airborne vehicle, configured to be flown at high altitudes, such as altitudes of 5-15 km, wherein the standard temperatures at these altitudes are typically around −50° C. and the air density is approximately 10-30% of those found at sea level.

According to some embodiments, a high-altitude balloon that operates as an aerial unit 100, may be filled with Helium, Hydrogen gas, hot air or any other known substance used to provide aerial lift. According to some embodiments, Aerial unit 100 may be tethered or untethered to the non-aerial unit 200.

According to some embodiments, aerial unit 100 may be any known aerial vehicle or platform, for example, a powered aircraft (either by internal combustion engine, jet propulsion, solar power or electrical power), a gliding aircraft (such as kite, glider etc.) or an aerostat (such as an airship, balloon, etc.) According to some embodiments, aerial unit 100 may be implemented on an existing aerial vehicle, for example, aerial unit 100 may be retrofitted to a commercial aviation plane to be carried upon or implemented with any section of its fuselage, wings or engines. An aerial unit 100 retrofitted upon an aerial vehicle may further rely on already existing systems, for example, it may use an aircraft's engine built-in compressor as a substitute to an integrated gas separation means 102 (disclosed below).

According to some embodiments, gas separation means 102 may comprise a compressor, pump or any known pressure increasing device configured to be carried by the aerial unit 100 and compress the surrounding air at high flow rates to pressures that are approximately 5-10 Bar above the ambient air pressure. According to some embodiments, and as mentioned above, the separation of carbon dioxide from the ambient air by the gas separation means 102 can be achieved by using various techniques and/or methods such as: refrigeration, heat pumping, multiple pumps/compressors, membranal separation, separation using chemical means such as catalysts, separation by biological enzymes, etc. Such techniques and methods may be used to increase the rate at which carbon is captured from the atmospheric ambient air, reduce the required energy for CO2 capturing, etc.

According to some embodiments, and since strong wind is generally abundant at high altitude, the high dynamic pressure caused by said high altitude strong wind in which the aerial unit 100 designed to operate, may be exploited for the purpose of separating CO2 from an airflow entering separation means 102. For example, gas separation means 102 located on an aerial unit 100 may use different types of membranes in order to filter the incoming airflow and produce filtered air having an increased CO2 concentration with regard to Nitrogen or other gases' concentration. Said increased CO2 concentration may be high over an order of magnitude (×10) with regard to the CO2 concentration in the ambient airflow, hence, harnessing the wind for the sake of said gaseous matter separation may significantly increase the efficiency of said process by reducing the need to comperes the incoming airflow.

According to some embodiments, since the gas separation means 102 of aerial unit 100 are configured to operate at high altitude, much of the energy generally used to compress ambient air at ground altitude is generally unneeded. According to some embodiments, after being separated from its CO2, the compressed air may be further utilized by using its potential stored energy. For example, the potential energy stored within the compressed air may be used directly to compress further airflow or indirectly to power various electrical/mechanical systems, thus leading to further energy/weight savings.

According to some embodiments, in order to increase carbon dioxide capture efficiency, the aerial unit 100 may utilize multiple gas separation means 102 in parallel, for example, gas separation means 102 may be multiple compressors aliened in series/in several stages in order to provide an efficient compression and separation of gaseous matter.

According to some embodiments, designated substances may be used for CO2 capture or CO2 separation and may be implemented within gas separation means 102 in order to increase the amount of CO2 available for separation. Said substances may be, for example, MOFs, ZIFs, or any other known sorbents for carbon capture and may be arranged in the form of thin films and produced by various chemical processes such as nano deposition techniques such as ALD, CVD, PVD, Glancing Angle Deposition, etc.

According to some embodiments, at least one storage means 106, for example, a compressed gas tank/s, is/are configured to store the separated gaseous matter such as CO2 in a liquid, solid or gas form after it has been extracted from the compressed air flow.

According to some embodiments, in order to maximize the CO2 extraction efficiency by aerial unit 100 and to allow maximum collection of gaseous matter given limited resources and constrains and in order to allow for more airborne time before the need of aerial unit 100 to land, the gaseous matter capture system 10 may be configured to release full gas tanks designed to safely land on a designated non-aerial unit/s or on predefined ground/watery locations for further utilization.

According to some embodiments, the gaseous matter capture system 10 further comprises a designated mechanism (not shown) configured to enable a controlled release of at least one storage means 106 that may be a compressed gas tank. For example, the controlled release means may be configured to disconnect storage means 106 after it has been filled with gaseous matter in order to eliminate excess weight from the airborne vehicle. According to some embodiments, storage means 106 is configured to be released and fall downwards to a pre-designated non-aerial unit, where it may be safely caught and collected.

According to some embodiments, storage means 106 may be a free-falling tank/s, configured to be thrown by/released from the aerial unit 100, using the aforementioned designated release mechanism, or alternatively, fall in a guided manner. Storage means 106 may include utilization of parachutes, gliding wings, propellers, gas injections or jet thrusters in order to provide trajectory correction ability or any other known steering/navigation means.

According to some embodiments, controller 104 is further configured to provide general operational control of the gaseous matter capture system 10. According to some embodiments, controller 104 may be positioned upon the aerial unit 100, upon the non-aerial unit 200, or may be located elsewhere, for example, on a remote server or as part of cloud computing platform. According to some embodiments, controller 104 is configured to provide navigation control to aerial unit 100, wherein said navigation control may be conducted automatically or manually by a user monitoring the operation of the gaseous matter capture system 10.

According to some embodiments, the aerial unit 100 may further comprise propulsive/steering means (not shown) that can be any known propulsive component configured to provide a controlled aerial deployment of the aerial unit 100. According to some embodiments, controller 104 may control the propulsive/steering means that may be jet thrusters, rocket propulsion, flaps, propeller of any sort or any other known means of propulsion.

According to some embodiments, the gaseous matter capture system 10 further comprises communications means (not shown) configured to provide a reliable and fast communication track between the aerial unit 100 and the non-aerial unit 200. For example, a communication system that may be controlled by the controller 104 may provide navigation commands to the aerial unit in accordance with various needs or restrains and may be operated either automatically or manually by a user monitoring the operation of the gaseous matter capture system 10.

According to some embodiments, the gaseous matter capture system 10 further comprises an energy source 108 that may be a power reservoir/battery, a hydrogen reservoir (that may simultaneously be used for lift purposes), solar panels/paints/sheets, wind turbines (in order to take advantage of the surrounding strong wind), nuclear power generators, thermal-nuclear power sources in conjunction with thermoelectric elements, etc. According to some embodiments, a tethered wire connected to the ground, the non-aerial unit 200 or to another airborne vehicle may provide the energy needed for the operation of aerial unit 100. According to some embodiments, the energy sources used to provide power to the gaseous matter capture system 10 are configured to be carbon neutral or close to it, in order not to contradict the main purpose of carbon dioxide extraction.

According to some embodiments, aerial unit 100 may be configured to be deployed in a relative position that has the ability to provide constant or near constant energetical availability, or has the ability to provide aerial unit 100 with improved gaseous matter capturing conditions. this can be achieved by adaptively changing the altitude/position of aerial unit 100 in order to utilize different wind directions or solar radiation conditions. According to some embodiments, in order to change the relative deployment of aerial unit 100, propulsion and/or navigation and steering means may be used as previously disclosed.

According to some embodiments, the final product of the gaseous matter capture system 10 may be high purity carbon dioxide intended for either storage or reuse in applications such as agriculture, food industry, research, synthetic near emission neutral fuels manufacturing, etc.

Figure 2:
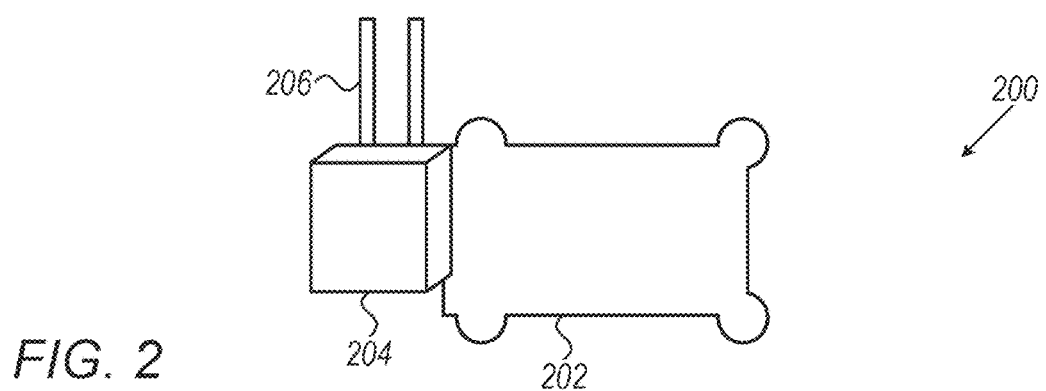
FIG. 2 constitutes a schematic perspective view of the non-aerial unit of a gaseous matter capture system, according to some embodiments of the invention.

Reference is now made to FIG. 2 which schematically illustrates a non-aerial unit 200 of gaseous matter capture system 10 (previously disclosed). As shown, a designated landing area 202 that may be any kind of capturing platform (such as a trampoline), is configured to provide a safe area for high velocity, large mass falls. The fast falling storage means 106 may land upon the landing area 202 to be further collected by any mechanical, robotic or manual means (not shown).

According to some embodiments, the non-aerial unit 200 may include a designated facility 204 configured to provide either maintenance requirements for aerial unit 100 and/or processing of the at least one storage means 106 after it has been loaded with gaseous matter and captured by the landing area 202.

According to some embodiments, the non-aerial unit 200 may be located on the ground or on a body of water floating platform, alternatively, the non-aerial unit 200 may be located upon a moving platform such as any kind of marine vessel or terrestrial vehicle. According to some embodiments, After the capturing of storage means 106 by the landing area 202 and the delivery of storage means 106 to the designated facility 204, industrial procedures that may be either chemical and/or mechanical may utilize the collected gaseous matter for further storage or use.

According to some embodiments, non-aerial unit 200 may further comprise docking area 206 configured for either marine vessels or terrestrial vehicles, in order to enable the transfer of the captured gaseous matter to another location.

Figure 3:
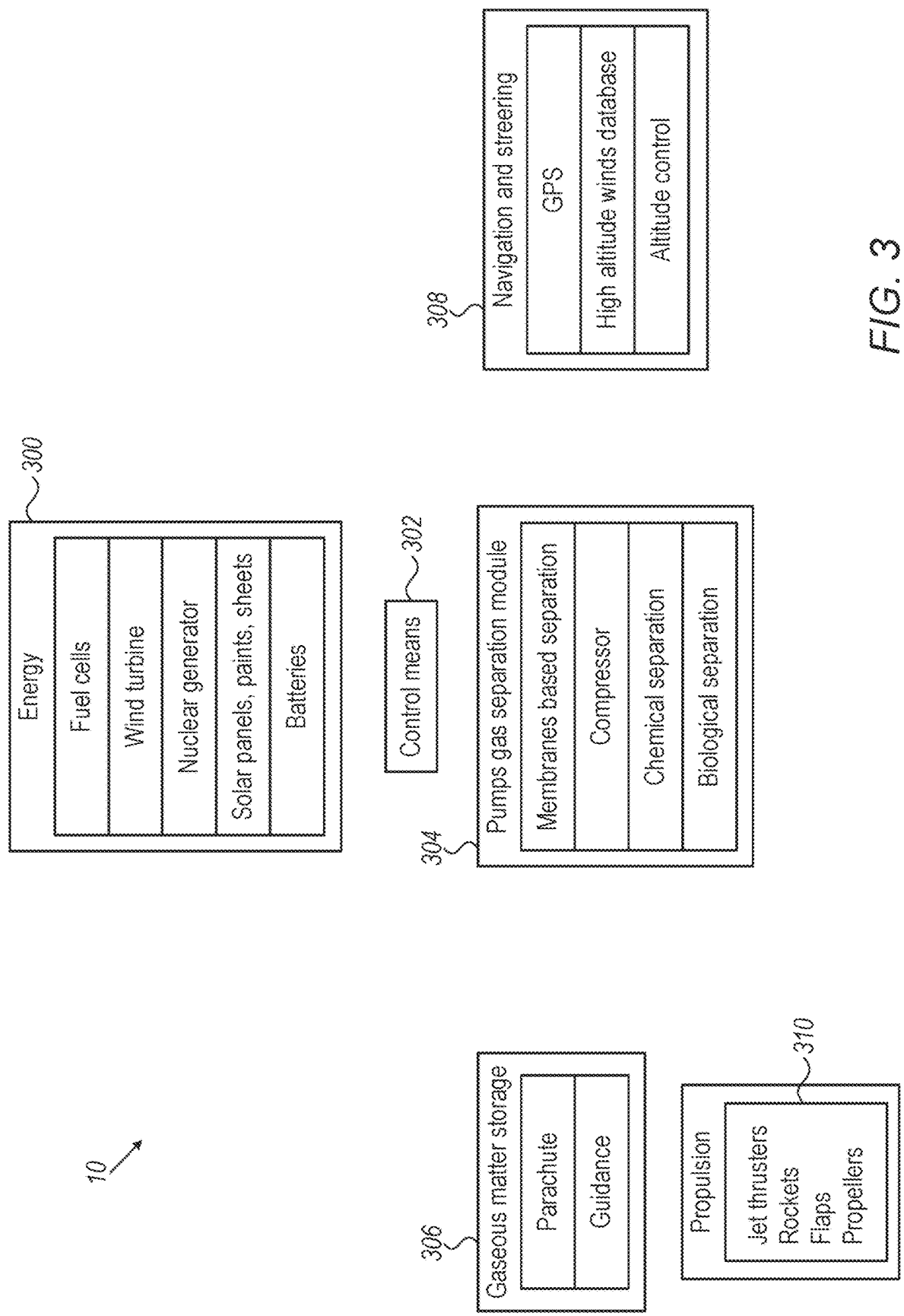
FIG. 3 constitutes a block diagram illustrating possible modules that form an aerial unit of a gaseous matter capture system, according to some embodiment of the invention.

Reference is now made to FIG. 3 which illustrates a block diagram disclosing possible modules that form aerial unit 100. As shown, energy module 300 may be a power reservoir such as a battery, hydrogen-based fuel cell, solar panel/paint/sheet, wind turbine, nuclear generator or any other power source that does not emit greenhouse gasses or generate reduced levels of greenhouse gasses.

According to some embodiments, control module 302 is further configured to provide general operational control of the gaseous matter capture system 10 and may comprise a controller positioned upon the aerial unit 100, upon the non-aerial unit 200 (not shown), or may be located elsewhere, for example, on a remote server or as part of cloud computing platform. According to some embodiments, control module 302 is configured to generate navigation/steering commands in order to control aerial unit 100, wherein said navigation/steering control may be conducted automatically or manually by a user monitoring the operation of the gaseous matter capture system 10. According to some embodiments, control module 302 is configured to monitor the various parameters and operations that are part of the gaseous matter capture system 10's activity.

According to some embodiments, gas separation module 304 is configured to enable the separation of gaseous matter such as carbon dioxide from the ambient air which may be done using multiple techniques and methods such as: single/multiple pumps or compressors (or any known pressure increasing device), membranes, separation using chemical means or catalysts, separation by biological enzymes, etc.

According to some embodiments, gaseous matter storage module 306 is configured to store a liquefied/solid or high pressurized gaseous matter such as carbon dioxide in at least one high-pressure container (storage means 106 previously disclosed), wherein said container may be a free-falling container configured to be thrown by/released from the aerial unit 100, using the aforementioned designated release mechanism, or, alternatively, fall in a guided manner According to some embodiments, said high-pressure container may include utilization of parachutes, gliding wings, propellers, gas injections, jet thrusters or any other known steering/navigation means in order to provide trajectory corrections ability.

According to some embodiments, navigation module 308 is configured to provide navigation abilities to the aerial unit 100 and may comprise designated navigation components such as GPS, altitude/velocity sensors, etc. in order to determine the exact location, height and relative position of the aerial unit 100. The navigation module 308 may further utilize a database regarding the wind regime at a certain location and altitude in order to adapt aerial unit 100's operation to changing weather conditions. According to some embodiments, navigation module 308 may be a separated module of may be integrated within control module 302.

According to some embodiments, propulsion module 310 is configured to propel the aerial unit 100 to a desired location/altitude, wherein the propulsion of aerial unit 100 may be conducted using jet thrusters, rocket propulsion, flaps, propellers of any sort or any other known means of propulsion.

Figure 4A:
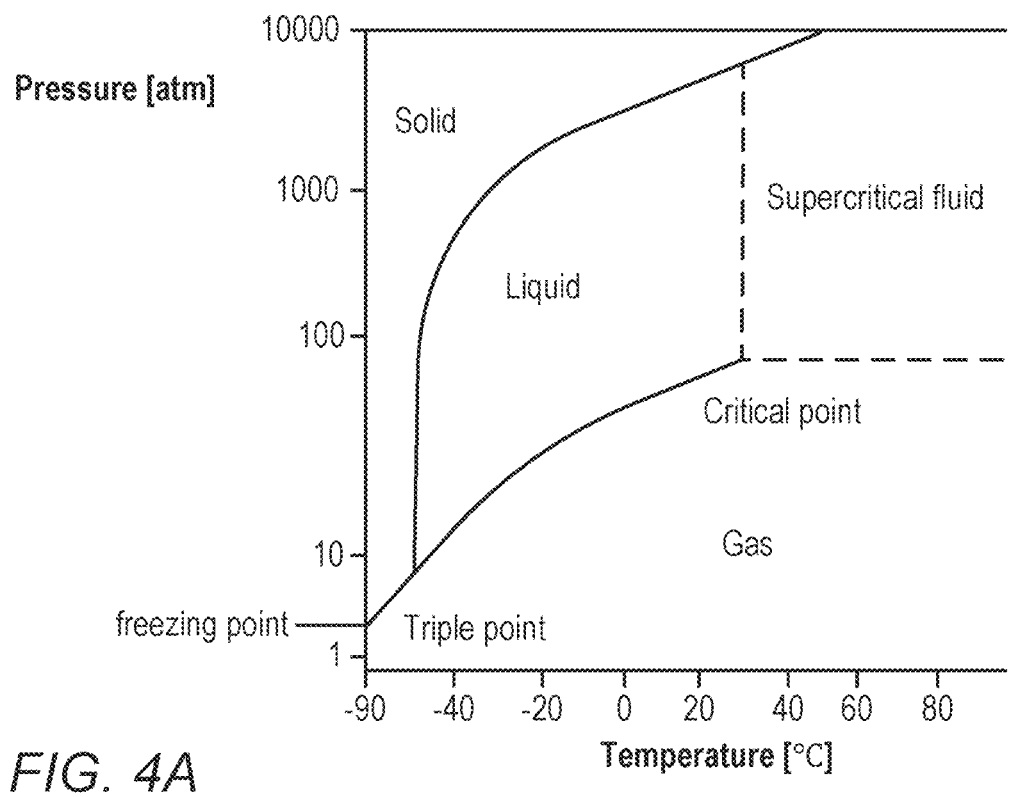
FIG. 4A constitutes a typical phase diagram of CO2 at various temperatures.

Reference is now made to FIG. 4A which illustrates a phase diagram depicting a carbon dioxide's phase transition at relatively low temperatures and relatively high pressures.

According to some embodiments, in order to liquefy the gas at a temperature of approximately −55° C., the required pressure should be approximately 6 atmospheres. Due to the said relatively high liquefaction pressure, gas liquification performed at high altitude may represent a challenge for a carbon capture procedure. As shown, the separation of carbon dioxide can be done by liquefaction or solidification. According to some embodiments, reaching any point below the triple point temperature of approximately −56° C. and having sufficiently high pressures, will result in carbon dioxide solidification. Conversely, increasing the pressure at temperatures above the triple point, for example by applying pressures of 6-10 Bar, will result in the liquefaction of carbon dioxide.

According to some embodiments, any combination of temperature and pressure within the limits that enable carbon dioxide liquefaction/solidification may be used during the operation of gaseous matter capture system 10.

According to some embodiments, since in high altitude the air density is approximately one third of the ambient air at sea-level, at least one stage of compression may be used in order to increase the incoming air pressure from said typical pressure at high altitude (0.2-0.8 Bar) in order to reach the range enabling carbon dioxide solidification/liquefication. The required increase in pressure may be multiplied by a ratio of 3 to 50 at the end of all compression stages in order to reach said typical transition pressure of 6-10 Bar.

According to some embodiments, when said pressure levels are reached, and given an appropriate temperature (approximately −55° C.), a liquefaction of the $CO_2$ contained within the processed incoming air is likely to follow. Alternatively, further reducing the temperature by 40° C.-70° C. while exposing the incoming air to sufficiently high pressure will mainly result in solidification of the $CO_2$ contained within the incoming air.

According to some embodiments, pressure or temperature changes may be done during a single compression/separation stage or during multiple stages. According to some embodiments, when using multiple compression/separation stages as part of the process of carbon dioxide capturing disclosed above, the coefficient of performance in cooling that represents some of the energetic efficiency, may be higher.

Figure 4B:
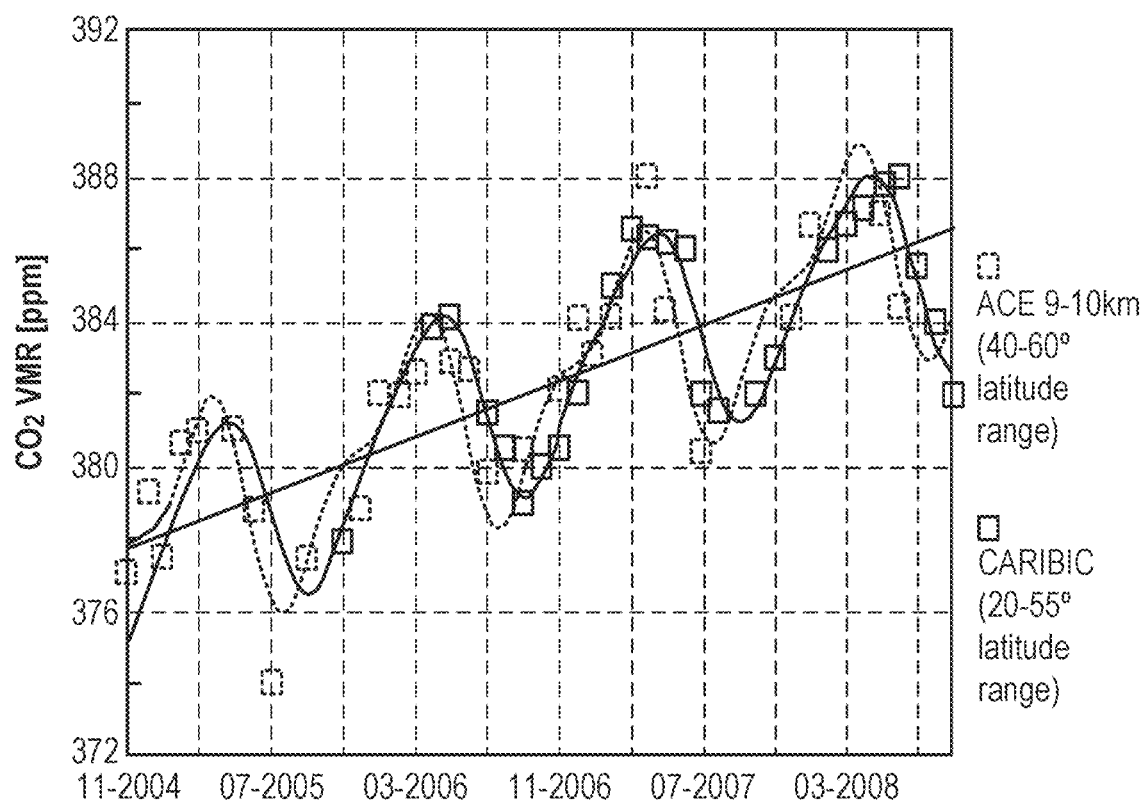
FIG. 4B constitutes a combo chart depicting sampled CO2 concentrations in the ambient air at different altitudes.

Reference is now made to FIG. 4B which illustrates a combo chart depicting sampled $CO_2$ concentrations in the ambient air at different altitudes (9-10 km) and various temperatures. As shown, the volumetric concentration of $CO_2$ remains almost the same at high altitudes, namely slightly under 400 ppm when compared to 411 at sea level. This may be due to the fact that the strong winds provide constant airflow and prevent dilution of $CO_2$.

According to some embodiments, the high altitude that aerial unit 100 is configured to be located at, represents a tradeoff between low temperatures that allow the use of less energy consumption to reach $CO_2$ phase transition, along with low overall pressures, which increase the energy consumption needed to reach a desired pressure in order to achieve $CO_2$ phase transition by either liquefaction or solidification. As noted above, the $CO_2$ concentration within the ambient air at different altitudes remains approximately similar, and does not significantly change the efficiency of the $CO_2$ separation process.

According to some embodiments, and as previously shown, compressing the incoming air entering the separation means 102 located on aerial unit 100 at high altitude in order to reach pressures of 6-10 bar results in $CO_2$ separating from the incoming airflow and stored in a liquid/solid form inside storage means 106. Considering the gas molar volumetric concentration (22.4 liters per mole) in standard conditions, in high altitude where the temperatures range is approximately −50° C. and the pressure is about 0.25 bar, the gas molar volumetric concentration is ~70 liters per mole (22.4 L/mole, multiplied by (223° C./273° C.) for the temperature correction and by (101.3 KPa/26.5 KPa) for the pressure correction results in 70 L/mole).

According to some embodiments, at a concentration of 400 ppm $CO_2$, and given a molar mass of 44 g/mole, there is a need to compress 70*2500 (2500 being the reciprocal of 400 ppm) liters to get to one mole, (or 44 grams). According to the above, in order to produce one ton of $CO_2$, there is a need to compress approximately 4 million cubic meters of ambient air.

Nowadays, simple and inexpensive compressors reach flow rates measured at several cubic feet per minute, or several liters per second. According to that, in order to reach a level of a metric ton per day would require several compressors in parallel.

According to some embodiments, it is possible to compress the air travelling at a typical high-altitude wind of 100 km/h through an orifice having a certain diameter, in order to reach high capacity, for example, 4 million m3 of flow rate within less than a day.

According to some embodiments, in order to introduce an overall solution to climate change, and assuming that each aerial unit 100 is able handling around one metric ton of $CO_2$ captured per day, a hypothetical gaseous matter capture system 10 will need to be comprised of 54 million aerial units 100 in order to capture all excess $CO_2$ introduced into the atmosphere in 2018. Considering that each aerial unit 100 has an annual price tag of $100K, the complete solution of an annual global $CO_2$ emissions capture will cost around $5,000B. this estimation is not only far lower than any known alternative, but significantly lower than the expected economic damage associated with climate change. For reference, the International Panel on Climate Change (IPCC) stated that it needs $13,000B to reverse the increasing trend of carbon emissions and lower it by 10 Billion Tons of $CO_2$. Meaning over twice the cost for less than half the result.

Figure 5:
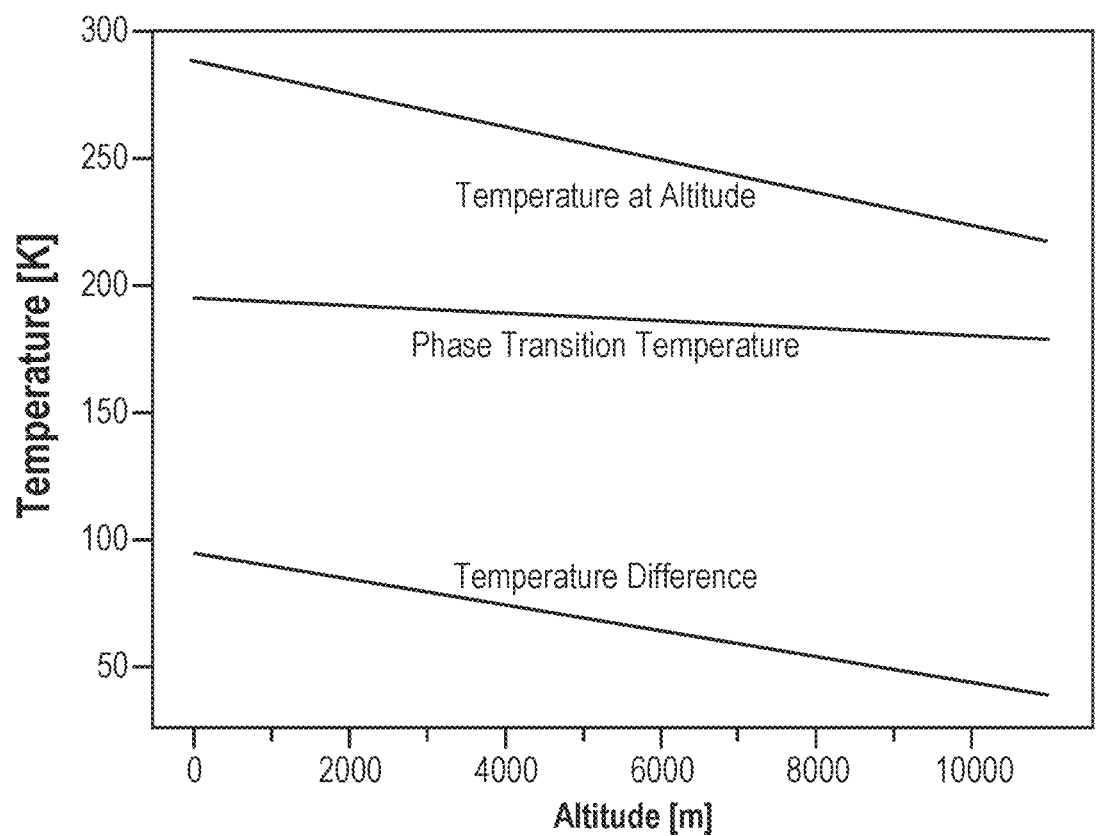
FIG. 5 constitutes a line graph illustrating the various temperatures and pressures having an effect on liquidation or solidification of CO2.

Reference is now made to FIG. 5 which illustrates a line graph depicting temperature differences affecting phase transition of $CO_2$ based on standard US atmospheric data. More particularly, the line graph represents the difference in temperatures affecting the initiation of phase transition of captured CO2 in accordance with the decrease in temperatures associated with increased altitude and lower/higher pressures.

According to some embodiments, at the inversion layer, (not shown, typically at altitudes of 11-13 kilometers above sea level, but potentially varying beyond these numbers in equatorial or polar regions), the required temperature difference decreases along all 3 lines, and hence the inversion layer represents the ideal altitude for performing high altitude gas separation. According to some embodiments, the ambient temperature at said inversion layer is approximately −50° C., and the ambient pressure is approximately 0.3 Bar. This means that to separate CO2 by solidifying it, a reduction of approximately 40° C. is required as seen in FIG. 4 showing the freezing point of CO2 is approximately −90° C. at 0.3 Bar.

According to some embodiments, and as part of the assumption that the ideal height for a gas separation process is at the inversion layer or its vicinity, there are some additional parameters that may be taken into account. Due to the increased pressure of the ambient air found in said inversion layer, various methods of gaseous matter separation using physical and chemical separation procedures may be enabled. For example, the use of molecular sieves such as Metal Organic Frameworks MOF, Zeolites or other designated substances may benefit in terms of gas separation efficiency from higher pressures occurring at the inversion layer or its vicinity.

According to some embodiments, the temperature differences required at a given altitude in order to perform gas separation procedure according to the standard US atmosphere data are disclosed:

According to some embodiments, an estimated calculation of either cooling the air to CO2 freezing temperature or compressing it to liquid/solid form is provided as follows: Cooling incoming air as part of the operation of the gaseous matter capture system 10 requires low air temperature with sufficient CO2 mass. For example, To cool $m_{CO2}$=100 Kg, by approximately 40° K lower than the ambient air temperature, will require $M_{tot} \cdot C_{air}*(40° K)$, where $C_{air}$~0.71 KJ/KG, and thus the energy cost is $7 \cdot 10^6$ KJ, or in a period or over a 12 hours day, 160 KW. In addition, the enthalpy of sublimation (latent heat) is ~590 KJ/Kg, meaning that an additional 1.5 KW are required for the phase transition, though this may be considered negligible compared to the total required cooling energy.

According to the second law of thermodynamics, the cooling efficiency is limited such that in order to remove ~160 KW of heat from the certain mass of air, and giving an ideal coefficient of performance of $$CoP = \frac{T_c}{T_h - T_c} \cong 4.5$$

(given a freezing temperature of −90° C., or 183° K, and a starting temperature of −50° C., or 223° K, put into the equation as Tc for the lower temperature and Th for the higher temperature), the suggested calculation may, for every watt used for heat removal, remove approximately 4.5 W from the cooled air by a single stage cooling at a maximal temperature difference, wherein multiple cooling stages will increase the efficiency of said cooling process in accordance with a decrease in temperature differences. Assuming that the average multiple stage cooling requires approximately 2 W of power, the result is a required energy of ~80 KW.

According to some embodiments, the above-mentioned power requirements may be achieved by harnessing the surface area of areal unit 100. For example, and using a technology of commercially available plastic based solar energy films, a power generation density of 100 Wp/m2 may be achieved by an aerial unit 100 having approximately 10-meter radius and approximately 200 m2 of surface area available at a given moment for power generation. Said surface area covered with solar energy films may produce approximately 40 KW of power that represents marginally sufficient energy at very high COPs (coefficient of performance).

According to some embodiments, the air processed by the areal unit 100 may be cooled down to the freezing temperature of CO2 and the captured CO2 may be stored in storage means 106. CO2 may be frozen by lowering its temperature to a range of −80° C. to −100° C. depending on the surrounding air pressure. Since the ambient temperature at high altitudes where the areal unit 100 is configured to operate is around −50° C., the potential cooling component of areal unit 100 can work typically at a Carnot efficiency of ~3.5 to ~6.4 [COP<Tc/(Th−Tc) when the air pressure is lower and resulting phase transition is at −100° C. (thus putting the numbers in units of ° K into the equation for COP, as 173° K for the lower temperature and 223° K for the higher temperature), the resulting COP is −173/(223−173)= 3.46, and when the air pressure is higher and resulting required temperature is −80° C. or 193° K−193/(223−193)= 6.43].

According to some embodiments, in order to overcome the latent sublimation heat that may be produced as part of the air-cooling procedure, there is a need to invest at least 200 J per each gram of CO2, meaning that for a rate of one gram per second, there is a need to remove 200 W of heat in order to overcome the produced latent heat. In accordance to the above, the upper limit of CO2 freezing rate (given a 1 KW power input) would be 17.5 g per second (756 Kg over a 12 hours' period), neglecting all other power needs. When dismissing 20% of this approximate efficiency as a reasonable assumption, we get that a 1 KW of power input is sufficient to allow phase transition of approximately 3 grams CO2 per second.

According to some embodiments, further capturing techniques using substances having high affinity to CO2, that include, among others, Metal Organic Frameworks (MOFs) may be used as part of the operation of areal unit 100. Using such techniques will increase the tendency of CO2 to nucleate on them and require less air volume to be cooled.

Figure 6A:
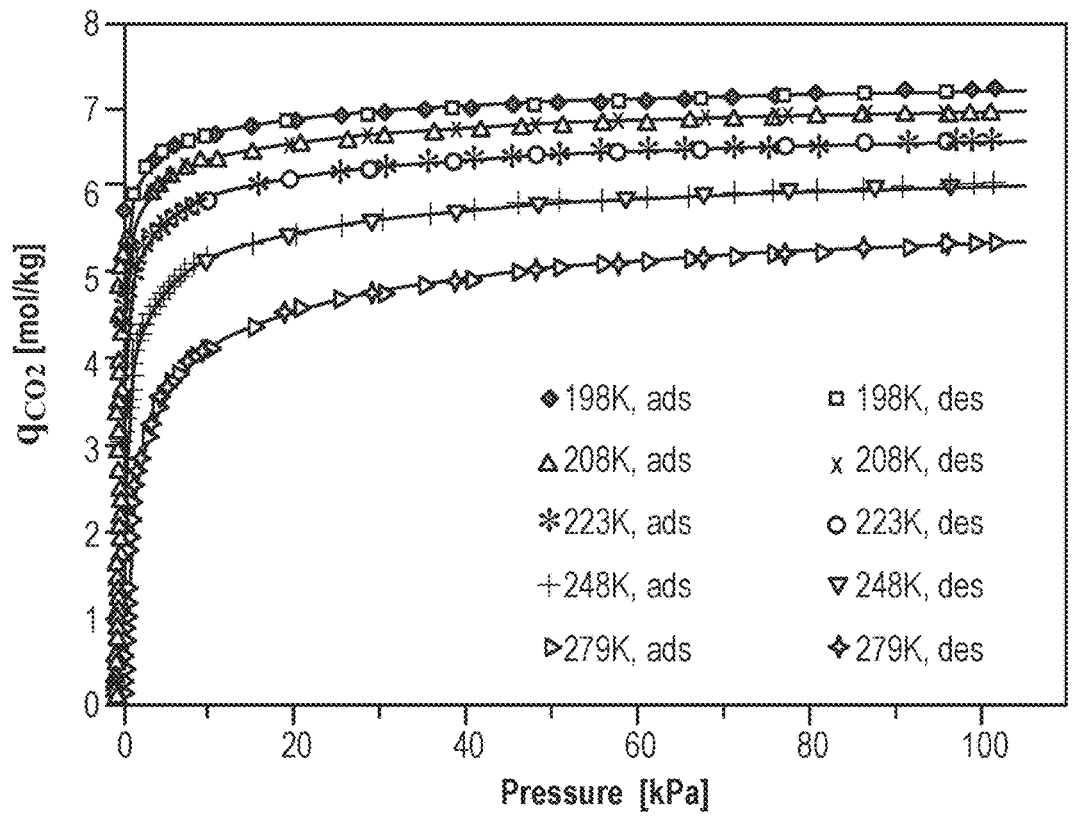
FIGS. 6A & 6B constitute a line graph illustrates the absorption capacities of sorbents for carbon capture having high affinity to CO2.
Figure 6B:
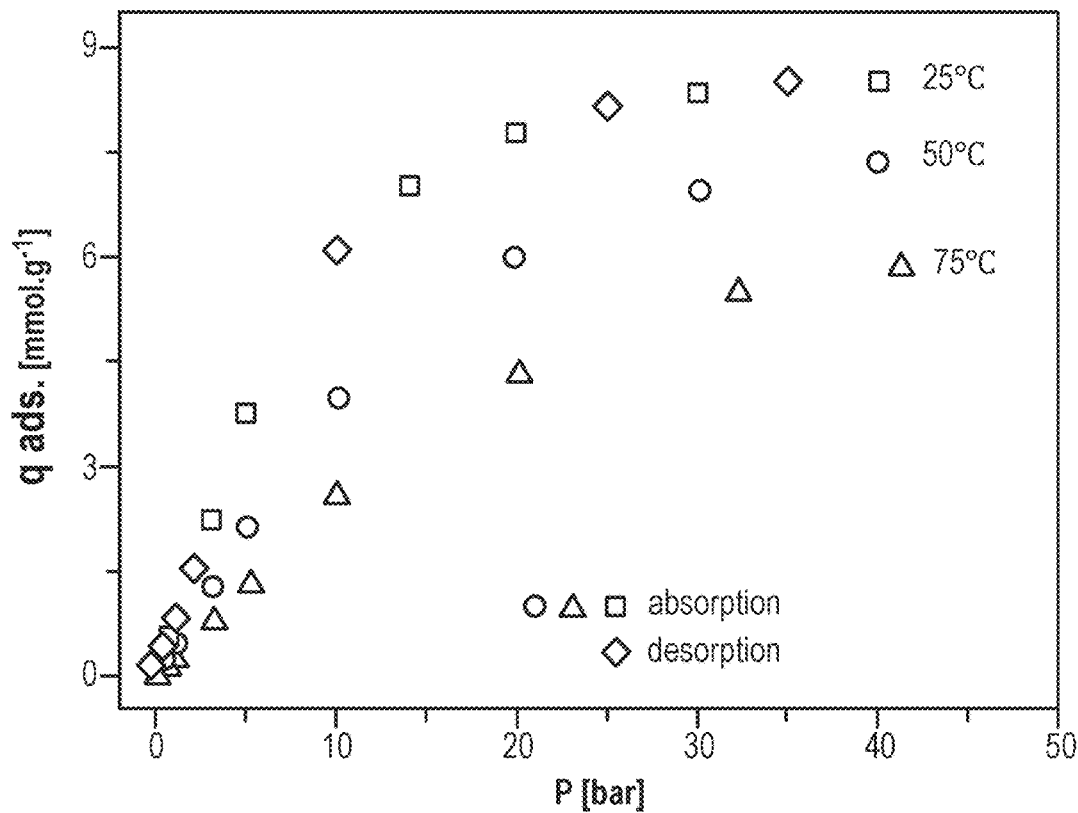

Reference is now made to FIGS. 6A & 6B which illustrates a line graph depicting absorption capacity of sorbents for carbon capture with high affinity to CO2 according to some embodiments of the invention. As shown, FIG. 6A depicts the adsorption capacity and absorption dynamics of CO2 in Zeolites with regard to various pressures. FIG. 6B depicts a particular MOF compound (ZIF-8) absorption property of CO2 at different temperatures and pressures. The results depicted on FIGS. 6A & 6B suggest that when using the aforementioned materials, the effect of decreasing temperatures is more prominent than variable pressure values with regard to the aforementioned substances' absorbing efficiency of CO2. In other words, the aforementioned substances ability to absorb CO2 increases dramatically when the temperature drops down to the inversion layer average temperature, as previously disclosed.

According to some embodiments, by using other substances and in other circumstances, various pressure swings required to adsorb and desorb a certain separated gas may be more prominent. In such cases and in others, deploying areal unit 100 at lower altitude with increased ambient temperature and higher air pressure, or alternatively, deploying areal unit 100 at higher altitude, typically with similar temperature yet with lower air pressure, may have a critical effect on the absorption efficiency of the gas separation process conducted by the areal unit 100. Hence, for some applications and embodiments, the gas separation process may be conducted at ambient temperature as high as approximately −10° C. and at a typical altitude of approximately 5 km above sea level. Alternatively, and according to some embodiments, in higher altitude of approximately 15 km, the pressure may drop to approximately 0.2 Bar while still allow a gas separation process with a benefit of decreasing the required energy for pressure reduction as part of desorbing processes.

Although the present invention has been described with reference to specific embodiments, this description is not meant to be construed in a limited sense. Various modifications of the disclosed embodiments, as well as alternative embodiments of the invention will become apparent to persons skilled in the art upon reference to the description of the invention. It is, therefore, contemplated that the appended claims will cover such modifications that fall within the scope of the invention.

The invention claimed is:

1. A gaseous matter capture system, comprising:
   (i) at least one aerial unit configured to be airborne;
   (ii) at least one non-aerial unit;
   (iii) at least one gas separation means configured to be carried by the aerial unit;
   (iv) storage means configured to be carried by the aerial unit;
   (v) a controller configured to control the system's operation; and
   (vi) an energy source configured to enable the system's operation,
   wherein the at least one gas separation means is configured to separate at least one designated gaseous matter from the air,
   wherein the at least one separated gaseous matter is configured to be stored within the storage means, and
   wherein the aerial unit is configured to transfer the stored separated gaseous matter to the non-aerial unit.

2. The system of claim 1, wherein the at least one gas separation means is operable while the aerial unit is airborne at an altitude range of 5-15 km.

3. The system of claim 1, wherein the gas separation means comprises at least one pressure increasing apparatus.

4. The system of claim 1, wherein the gas separation means comprises chemical means designated to utilize gas separation procedure.

5. The system of claim 1, wherein the aerial unit further comprises self-steering means.

6. The system of claim 1, wherein the aerial unit is configured to be retrofitted to an aerial vehicle or integrated into a propulsion means of an aerial vehicle.

7. The system of claim 1, wherein the storage means is at least one compressed gas container and wherein the system comprises control means located on the compressed gas container and configured to provide trajectory corrections ability and control the path of the at least one compressed gas container from the aerial unit to the non-aerial unit.

8. The system of claim 7, wherein the at least one compressed gas container is configured to be released from the aerial unit and reach the non-aerial unit using said control means and wherein the non-aerial unit comprises a designated landing area configured to capture the at least one compressed gas container.

9. The system of claim 1, wherein the non-aerial unit is configured to utilize the stored designated gaseous matter stored within the storage means.

10. The system of claim 1, wherein the controller is further configured to generate navigation commands in order to control the aerial unit.

11. The system of claim 1, wherein the airborne aerial unit is configured to exploit low temperatures found at high altitudes in order to liquefy or solidify the designated gaseous matter.

12. The system of claim 1, wherein the at least one gas separation means carried by the airborne aerial unit is configured to exploit high altitude wind in order to harness an incoming airflow pressure for the purpose of gas separation.

13. The system of claim 3, wherein a potential energy stored within the compressed air may be further utilized by the gaseous matter capture system.

14. The system of claim 1, wherein the designated gaseous matter is carbon dioxide and the aerial unit is configured to capture carbon dioxide by using a phase transition process at a temperatures range of −100° to −10° and pressures range of 0.2-10 Bar.

15. A method for gaseous matter capture using a gaseous matter capture system, comprising the steps of:
   (i) separating at least one designated gaseous matter from the air using at least one gas separation means carried by an airborne aerial unit,
   (ii) storing the at least one separated gaseous matter within storage means carried by the airborne aerial unit,
   (iii) transferring the stored separated gaseous matter to a non-aerial unit.

16. The method of claim 15, wherein the airborne aerial unit is configured to exploit low temperatures found at high altitudes in order to liquefy or solidify the designated gaseous matter.

17. The method of claim 15, wherein the designated gaseous matter is carbon dioxide and the aerial unit is configured to capture carbon dioxide by using a phase transition process at a temperatures range of −100° to −10° and pressures range of 0.2-10 Bar.

18. The method of claim 15, wherein the at least one gas separation means carried by the airborne aerial unit is configured to exploit high altitude wind in order to harness an incoming airflow pressure for the purpose of gas separation.

* * * * *